Dec. 22, 1959  J. A. LAVALLEE  2,917,952
REAMER MANUFACTURE
Filed Sept. 5, 1958
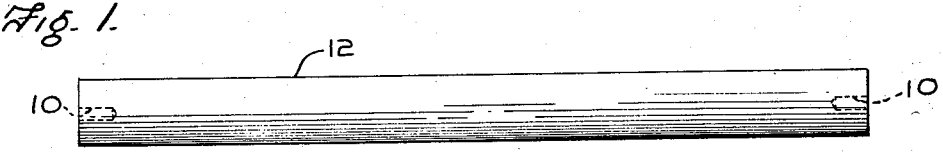
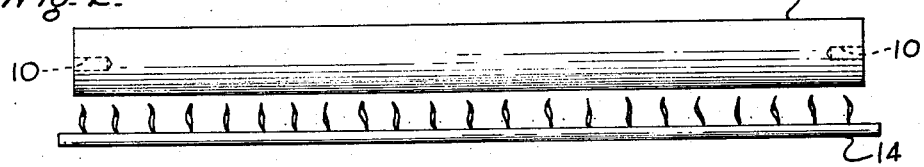
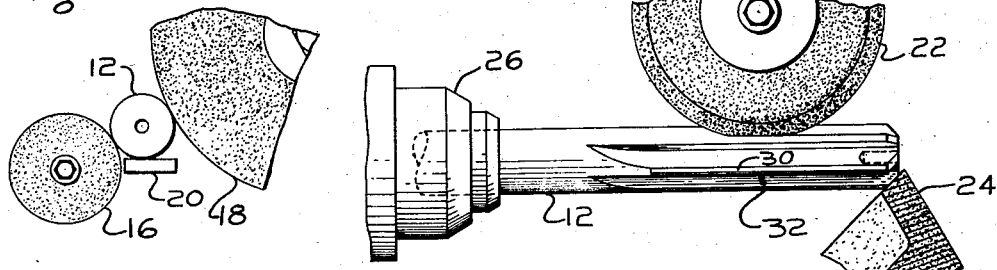
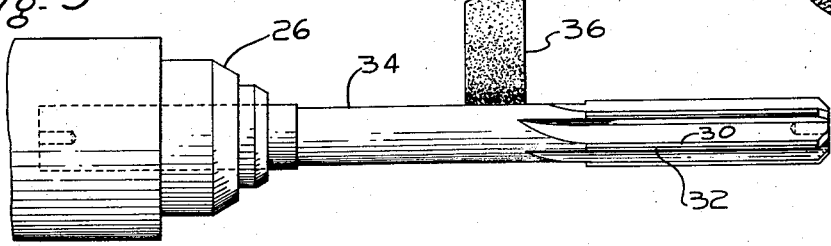
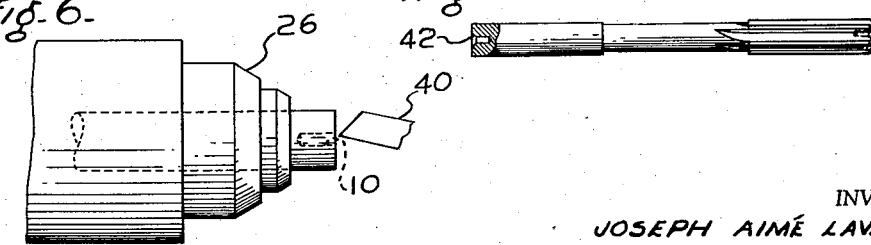
INVENTOR
JOSEPH AIMÉ LAVALLEE
BY Chapin & Neal
ATTORNEYS United States Patent Office 2,917,952
Patented Dec. 22, 1959

2,917,952
REAMER MANUFACTURE

Joseph Aime Lavallee, Springfield, Mass., assignor to Lavallee & Ide, Inc., Chicopee, Mass., a corporation of New York Application September 5, 1958, Serial No. 759,201

4 Claims. (Cl. 76—101)

The present invention relates to the manufacture of reamers.

The object of the invention is to economically provide reamers capable of holding extremely close tolerances as, for example, are required in the manufacture of precision machinery and mechanisms.

An essential feature of the invention, as will be more fully developed hereinafter, is the method step of grinding both the shank and flute ends of a reamer blank to a desired final diameter after the blank has been hardened and before the flutes have been formed. In following this procedure, it is possible to obtain absolute concentricity which in turn enables tolerances of reamed holes to be held to ±.0002 inch or less. As will be further developed, it is possible to mass produce these reamers, having absolute concentricity, at a cost comparable to or less than the cost of reamers manufactured by conventional methods.

The above and other related objects and features of the invention will be apparent from a reading of the following specification in which reference is made to the accompanying drawing and the particular novelty thereof pointed out in the appended claims.

In the drawing:

Figs. 1–6 diagrammatically illustrate the various steps of manufacturing reamers in accordance with the present invention; and Fig. 7 is a view of a finished reamer on a reduced scale.

One of the advantages of the present invention is the elimination of the necessity of providing centers in the ends of a reamer for manufacturing purposes. Nonetheless, centers are at times desired when the reamer is in use or requires resharpening. To provide such centers in the finished reamer, the first step of the present invention may advantageously be to drill a relatively shallow axial hole 10 in each end of a soft reamer blank 12 as seen in Fig. 1.

The next step of the present process is to harden the blank 12 by whatever heat treating technique is required to give the strength and hardness characteristics requisite for the finished reamer. This step is illustratively shown in Fig. 2 wherein it will be seen that the blank 12 is heated by gas flames from pipe 14.

At this point it will be noted that the blank 12 may be of any material suitable for reamers and that the heat treatment will, of course, depend on the material or alloy selected. It will also be noted that the present method could begin simply with the provision of a hardened reamer blank of desired length and generally circular cross section.

With the hardened blank in hand, the next step is to grind the blank 12 from end to end to a given diameter which is to be the final diameter of the reamer. Preferably this is done by a centerless grinding setup including grinding wheels 16 and 18 with the blank 12 resting on a support 20 as indicated in Fig. 5. Centerless grinding enables a very close tolerance to be held on the diameter of the blank 12 and further, the circular runout or deviation from a true circular cross-section is, for practical purposes, non-existent. Another advantage of centerless grinding is that these tolerances may be maintained in mass production in a highly economical manner.

After the blank 12 has been ground to final size, any one of several steps may be performed. The next step illustrated in Fig. 4 of the drawing is to grind and sharpen flutes on one end of the blank 12 as by the use of grinding wheels 22 and 24. The blank 10 is held in a collet 26 by what is now its shank end as the flutes are ground. The collet 26 may be indexed for the grinding and sharpening of successive flutes. After the flutes are ground, a relief 30 is ground on the trailing side of each flute. In grinding the relief 30 a narrow lengthwise land 32 of the centerless ground diameter is left untouched so that the cutting diameter of flute end of the reamer remains absolutely concentric with the shank end thereof. It would, of course, be possible to form flutes with other contours so long as the outer lengthwise edges of the flutes are defined by the same diameter which was originally obtained by grinding the reamer blank throughout its length.

The next step, illustrated in Fig. 5 of the drawing, is to grind a reduced diameter 34 intermediate the length of the reamer and extending part-way into its fluted portion. As illustratively shown, the reamer is again gripped by its shank end in the collet 26 and thereby rotated as the diameter 34 is ground by the grinding wheel 36. In this fashion chip clearance relief is provided.

Once the flutes have been ground and sharpened the reamer is ready for use. As will now be apparent, this is accomplished without the need of centers in the end of the reamer, even where the chip clearance relief diameter 34 is provided. However, it is an easy matter to provide such centers so that they may later be available in the use of the reamer. The primary purpose of drilling the holes 10 before hardening of the blank 12 was to remove stock of the dead center of the reamer blank. Thus, after hardening, it is possible to true these holes, preferably in a countersunk fashion on the normal angle for centers in this type of tool. The trueing operation is illustrated in Fig. 6 wherein it will be seen that the reamer is again gripped and rotated by collet 26 and a carbide tool 40 employed to form a center 42 (Fig. 7) in one end of the reamer. Thereafter, the reamer may be turned end for end and the other center formed. It will, of course, be apparent that a grinding wheel could be used instead of the carbide tool 40.

The finished reamer is seen in Fig. 7. The steps for making this reamer approach the ultimate in economy, while at the same time providing reproducible accuracy. Thus, not only does the reamer inherently give absolute concentricity but it is possible to mass produce these reamers at a minimum cost.

Having thus described the invention what is claimed as novel and desired to be secured by Letters Patent of the United States is:

1. In the manufacture of reamers that method which comprises the steps of drilling relatively shallow axial holes in each end of a soft reamer blank, thereafter hardening the reamer blank, then centerless grinding the blank from end to end to a predetermined diameter which is to be the final diameter of the reamer, thereafter grinding flutes in one end of the reamer leaving a narrow lengthwise land of the centerless ground diameter to define the outer edge of each flute, and trueing said shallow holes concentrically of said centerless ground diameter to provide a center in each end of the reamer.

2. In the manufacture of reamers that method which comprises the steps of centerless grinding a hardened reamer blank from end to end to a predetermined diameter which is to be the final diameter of the reamer, thereafter grinding flutes in one end portion of the reamer blank leaving a narrow lengthwise land of the centerless ground diameter to define the outer edge of each flute and grinding a reduced diameter intermediate the length of the reamer and extending part-way into the flute portion thereof to provide a chip clearance relief.

3. In the manufacture of reamers that method which comprises the steps of centerless grinding a hardened reamer blank from end to end to a predetermined diameter which is to be the final diameter of the reamer, and thereafter grinding flutes in one end portion of the reamer blank leaving a narrow lengthwise land of the centerless ground diameter to define the outer edge of each flute.

4. The method of manufacturing reamers comprising the steps of drilling relatively shallow axial holes in each end of a soft reamer blank, thereafter hardening the reamer blank, then centerless grinding the blank from end to end to a predetermined diameter which is to be the final diameter of the reamer, thereafter grinding flutes in one end portion of the reamer blank leaving a narrow lengthwise land of the centerless ground diameter to define the outer edge of each flute, gripping the centerless ground diameter at its shank end opposite the flute end and rotating the reamer blank about its axis, grinding a reduced diameter intermediate the length of the rotating reamer blank and extending part way into the flute portion thereof to provide a chip clearance relief, again gripping said ground diameter and rotating said blank about its axis and engaging first one and then the other of said axial holes with stock removing means to true said holes concentrically of said centerless ground diameter to provide a center in each end of the reamer.

References Cited in the file of this patent

UNITED STATES PATENTS

| | | |
|---|---|---|
| 1,490,069 | Gammons | Apr. 8, 1924 |
| 2,034,514 | Hayden et al. | Mar. 17, 1936 |
| 2,361,379 | Broga | Oct. 31, 1944 |

FOREIGN PATENTS

| | | |
|---|---|---|
| 619,641 | Great Britain | Mar. 11, 1949 |